UNITED STATES PATENT OFFICE.

SYLVESTER M. NEVILLE, OF CLEVELAND, OHIO.

DYE.

SPECIFICATION forming part of Letters Patent No. 396,417, dated January 22, 1889.

Application filed December 2, 1887. Serial No. 256,811. (No specimens.)

*To all whom it may concern:*

Be it known that I, SYLVESTER M. NEVILLE, of Cleveland, in the county of Cuyahoga and State of Ohio, have invented certain new and useful Improvements in Coloring Compositions; and I do hereby declare the following to be a full, clear, and exact description of the invention, such as will enable others skilled in the art to which it pertains to make and use the same.

My invention relates to an improved coloring composition soluble in benzine, ether, turpentine, and similar solvents, this coloring-matter being composed, essentially, of oil or fatty matter, pigment, and metallic salts. Heretofore a coloring compound has been used composed of rosin, coloring-matter, and metallic salts, (see United States Patent No. 342,207, granted May 18, 1886, to Armand Muller-Jacobs;) but such coloring-matter was more opaque than desirable for many purposes. To provide a coloring-matter more brilliant in luster and more transparent I discard rosin and in place thereof use oil or fatty matter.

The manner of preparing my improved coloring compound is as follows: First, common soap is diluted or dissolved in water; second, mix in any coloring-matter that will dissolve in water or liquid soap—such, for instance, as aniline colors; third, mix in a metallic salt—such, for instance, as sulphate of zinc, or any other suitable metallic salts. The oily or fatty matter of the soap, the pigment, and metallic salts will unite into a precipitate. The latter is drained and dried, such precipitate being the subject of my invention. The product is insoluble in water or alcohol, but is soluble in benzine, turpentine, and similar solvents. The product is brilliant in luster, more especially where aniline colors are used, and when applied as paint or coloring-matter is quite transparent, by reason of which it is well adapted to color glass and for various other purposes where transparent paint is required. The soap used in preparing this compound is of a non-rosinate variety, as the use of rosin would deteriorate the quality of the product, rendering the same much less transparent.

In addition to the superior qualities of my improved coloring compound, as compared with the compound described in the aforesaid patent, my compound can be made with much less trouble and expense. The pigment and metallic salts are easily mixed in the liquid soap, and but one drying operation is required, whereas in the process described in the aforesaid patent two mixing operations and two drying operations are required, and the mixing of the rosinate of a metal with the coloring-matter is a slow and tedious process, requiring much time and care; otherwise the ingredient will not be thoroughly mixed.

What I claim is—

1. A coloring composition insoluble in water and alcohol and soluble in benzine, turpentine, and similar solvents, consisting, essentially, of fatty matter—such as common soap—sulphate of zinc, and such pigment as before compounding is soluble in water or liquid, substantially as set forth.

2. A coloring composition insoluble in water and alcohol and soluble in benzine, turpentine, and similar solvents, consisting, essentially, of common soap diluted or dissolved in water, coloring-matter, as aniline colors such as will dissolve in liquid soap, and sulphate of zinc, substantially as set forth.

In testimony whereof I sign this specification, in the presence of two witnesses, this 27th day of October, 1887.

SYLVESTER M. NEVILLE.

Witnesses:
CHAS. H. DORER,
ALBERT E. LYNCH.